United States Patent [19]

Tsai

[11] Patent Number: 4,818,134
[45] Date of Patent: Apr. 4, 1989

[54] CLEANING PEN FOR CLEANING SPECTACLE LENSES

[76] Inventor: Allan Tsai, 2nd Fl., No. 1, Lane 222, Tun Hua N. Rd., Taipei, Taiwan

[21] Appl. No.: 62,839

[22] Filed: Jun. 16, 1987

Related U.S. Application Data

[63] Continuation-in-part of Ser. No. 17,847, Feb. 24, 1987, abandoned.

[51] Int. Cl.⁴ ............................................. G02C 13/00
[52] U.S. Cl. .................................... 401/195; 7/165; 15/214; 206/226; 401/23; 401/37; 401/202; 401/196
[58] Field of Search ............... 401/196, 125, 198, 199, 401/202, 37, 23, 18, 261, 195; 15/214; 206/226, 230; 7/165

[56] References Cited

U.S. PATENT DOCUMENTS

| | | | |
|---|---|---|---|
| 294,663 | 3/1884 | Parmelee | 7/165 X |
| 524,158 | 8/1894 | Berk | 401/23 |
| 1,615,319 | 1/1927 | Wynn | 401/125 X |
| 2,049,973 | 8/1936 | Nesmith | 401/261 |
| 2,935,186 | 5/1960 | Clark | 206/226 |
| 4,389,132 | 6/1983 | Valadez | 401/195 |

FOREIGN PATENT DOCUMENTS

| | | | |
|---|---|---|---|
| 1303573 | 8/1962 | France | 206/230 |
| 249885 | 5/1948 | Switzerland | 401/198 |

*Primary Examiner*—Steven A. Bratlie
*Attorney, Agent, or Firm*—Ladas & Parry

[57] ABSTRACT

A cleaning pen for cleaning spectacle lenses includes a pen body, a cleaning tip, and a detergent reservoir contained in the pen body for automatically feeding the cleaning tip with detergent. A container which contains a cleaning cloth and at least one spectacle screwdriver therein is mounted removably on the pen body. A pen cap having a clip is sleeved removably on the pen body. The reservoir is designed so that the detergent is implemented therein. The container is designed so that the cleaning cloth and the spectacle screwdriver are removed conveniently therefrom.

1 Claim, 2 Drawing Sheets

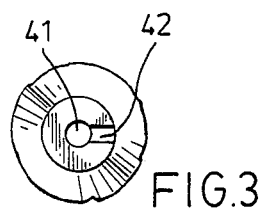
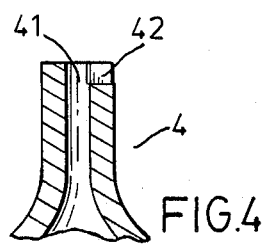
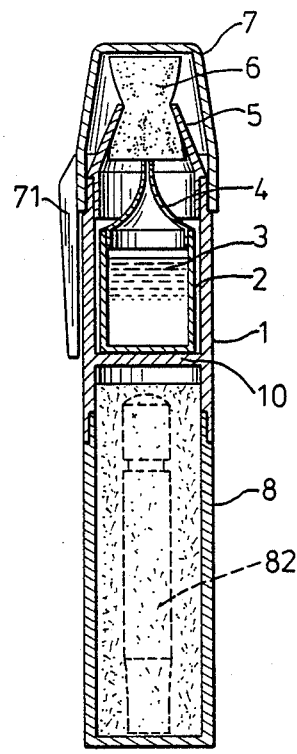
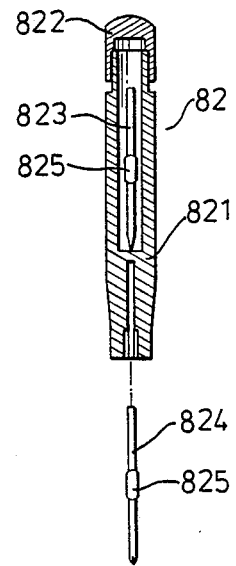

CLEANING PEN FOR CLEANING SPECTACLE LENSES

CROSS-REFERENCE TO RELATED APPLICATION

The present invention is a continuation-in-part of my copending application Ser. No. 17,847 filed Feb. 24, 1987.

BACKGROUND OF THE INVENTION

The present invention relates to an improved tool for cleaning spectacle lenses, and more particularly to a cleaning pen containing a detergent reservoir which automatically feeds the cleaning tip with detergent.

Heretofore, those wearing spectacles, especially myopic spectacles, inevitably suffer from the following problems:

(1) Many atmospheric impurities (e.g. dust, oil dirt, vapor, etc.) often deposit on the spectacle lens. Thus, a cleaning cloth and a detergent for use in cleaning spectacle lens are always needed. The detergent for use in cleaning spectacle lenses, which may be antifoggant or antistatic agent, or the composition thereof, is used before the cleaning cloth is used. In absence of either the cleaning cloth or the detergent, the spectacle lens can not be cleaned effectively. Furthermore, when the cleaning cloth and the detergent are not available, such things as clothes, toilet paper, and handchief may be used as the substitute of the cleaning cloth. These substitutes are not only ineffective for cleaning spectacle lenses, but also may damage the same.

(2) When either of the spectacle screws becomes so loose as to fall out of the spectacle frame, a suitably sized spectacle screwdriver is needed.

Presently, it is very unconvenient to carry these particular tools simultaneously.

SUMMARY OF THE INVENTION

It is therefore the main object of the present invention to provide a cleaning pen for cleaning spectacle lenses, in which a detergent reservoir for automatically feeding the cleaning tip with detergent is provided.

It is another object of the present invention to provide a cleaning pen for cleaning spectacle lenses, in which a cleaning cloth and at least one spectacle screwdriver are removably contained.

It is still another object of the present invention to provide a cleaning pen for clearing spectacle lenses, on which a pen cap with a clip is sleeved removably so that it can be conveniently carried.

According to the present invention, the cleaning pen for clearing spectacle lens from dirt includes a pen body including a first containing means thereon, the first containing means having an open end and containing a detergent therein; a cover, mounted removably on an end portion of the pen body for closing the open end of the first containing means, having an eyelet therein communicated with the first containing means; a cleaning tip of capillary action communicated with the eyelet of the cover; a cleaning tip fixture mounted removably on the pen body for holding the cleaning tip thereon; a second containing means mounted removably on the opposite end portion of the pen body for containing removably a cleaning cloth and at least one spectacle screwdriver therein; and a pen cap, sleeved removably on the pen body so that the cleaning tip is sealed within the pen cap, and the pen cap having a clip secured thereto.

The pen cap, the cleaning tip and the cover are designed so that it is difficult for the detergent contained in the first containing means to escape undesirably from the pen body and so that it is easy for the detergent to be implemented into the the first containing means as required.

The cleaning cloth and the spectacle screwdriver are arranged so that they can be taken conveniently from the pen body by hand.

BRIEF DESCRIPTION OF THE DRAWINGS

Other features and advantages of the present invention will become apparent from the following detailed description of a preferred embodiment of the present invention with reference to the accompanying drawings in which:

FIG. 2 is a sectional view showing the cleaning pen of the present invention, in which the phantom lines show a small container received within the cleaning pen of the present invention;

FIG. 3 is a schematic longitudinal sectional view showing part of a funnel-shaped cover of the cleaning pen according to the present invention;

FIG. 4 is an elevational top view of FIG. 3; and

FIG. 5 is a schematic sectional view showing the small container of the cleaning pen according to the present invention.

DETAILED DESCRIPTION OF THE PREFERRED EMBODIMENT

Figure 1:
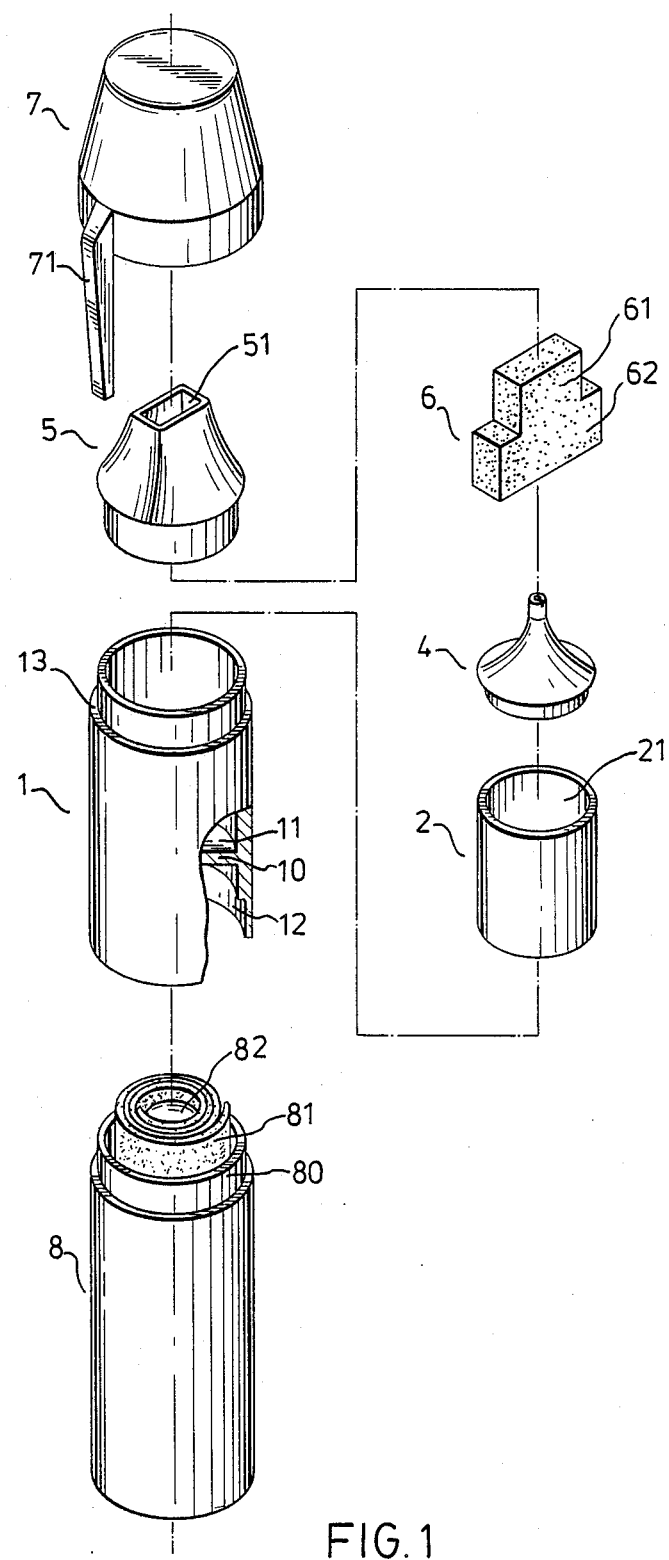
FIG. 1 is an exploded view of a cleaning pen for clearing spectacle lenses according to the present invention.

Referring to FIG. 1 with reference to FIGS. 2 to 5, there is shown a cleaning pen for cleaning spectacle lens from dirt according to the present invention. The cleaning pen has a tubular pen body 1 in which a partition 10 is formed. The partition 10 defines an upper chamber 11 and a lower chamber 12 in the tubular pen body 1.

Received in the upper chamber 11 of the pen body 1 is a first cylindrical container 2 having an upper end opening 21 and containing a detergent 3 in the upper chamber 11. The upper end opening 21 of the first cylindrical container 2 is covered tightly and removably by a funnel-shaped cover 4 having a conical end surface in which an opening or eyelet 41 and an open-ended rectangular slot 42 communicated with the eyelet 41 are provided.

The upper end of the pen body 1 is formed with a diameter-reduced portion 13. Inserted into the diameter-reduced portion 13 is a tubular cover 5 which has a rectangular upper end opening 51. Held on the cover 5 is a cleaning tip 6 made of sponge, which has a rectangular head 61 and a rectangular shoulder 62. The head 61 extends out of the rectangular opening 51 of the cover 5 for cleaning the spectacle lens. The shoulder 62 is compressed by the conical end of the funnel-shaped cover 4 for securing the cleaning tip 6 on the fixture 5 by incoporating with the cover 4.

Sleeved on the diameter-reduced portion 13 of the pen body 1 is a pen cap 7 which has a clip 71 so that the cleaning pen is carried conveniently.

The lower chamber 12 of the pen body 1 has an enlarged space at the lower end portion thereof for sleeving tightly on a diameter-reduced portion 80 of a second cylindrical container 8. Contained within the second cylindrical container 8 are a roll of cleaning cloth 81 for cleaning spectacle lens, and a small container 82 rolled within the cleaning cloth 81. Each of the cleaning cloth 81 and the small container 82 has a portion extending out of the second cylindrical container 8 so that they are taken conveniently from the second cylindrical container 8 by hand.

The small container 8, as shown in FIG. 5, includes a body 821 and a removable small cover 822. Contained within the body 821 are a pair of spectacle screwdrivers which includes a plain screwdriver 823 and a cross-recess screwdriver 824. Each of the spectacle screwdrivers 823 and 824 has a flatted portion 825. The flatted portions 825 of the plain screwdriver 823 and the cross-recess screwdriver 824 are respectively spaced from their non-driving end at the same distance. To conveniently use the screwdrivers 823 and 824, the small container body 821 has a socket of a shape conforming to the non-driving end portions of the screwdrivers 823 and 824 so that one of the non-driving end portions of the screwdrivers 823 and 824 is inserted into the socket.

In this embodiment, the eyelet 41 has a diameter of as small as 0.8 mm so that it is difficult for the detergent 3 contained in the first cylindrical container 2 to escape undesirably from the first cylindrical container 2. In addition, the rectangular slot 42 has of a depth of 0.8 mm and a width of 0.8 mm so as to remove the impurities entrained in the detergent 3 therethrough when used.

With the present invention thus explained, it is apparent that various modifications and variations can be made without departing from the scope and spirit of the present invention. It is therefore intended that the present invention be limited only as indicated in the appended claims.

What is claimed is:

1. A pen-like eyeglass cleaner comprising:
   a tubular pen body having first and second end portions and an interior partition between said first and second end portions for forming first and second chambers within said pen body;
   a detergent container placed within said first chamber, said container including a cover having an outer end surface which has an eyelet opening and an openended slot communicated from the interior of the container with said eyelet opening;
   a detergent contained in said detergent container;
   a wiping tip of absorbent material having opposite ends;
   a tubular cover telescopically received on said first end portion of said tubular pen body, said cover having a rectangular end opening, said cover holding said wiping tip in such a manner that one end of said wiping tip contacts said outer end surface of said detergent container and communicates with said eyelet opening and the other end of said wiping tip extends through said rectangular opening in said cover;
   a cap, sized to fit sealingly on said first end portion over said cover and having a clip secured thereto;
   a roll of cleaning cloth:
   a cloth container having an open end portion inserted tightly into said second end portion of said pen body for defining therebetween a sealed chamber in which said roll of cleaning cloth is contained;
   a screwdriver; and
   a screwdriver container, rolled within said roll of cleaning cloth, receiving said screwdriver therein, including a screwdriver socket formed at an end thereof so that said screwdriver may be secured in said screwdriver socket for use.

* * * * *